United States Patent [19]

Etra

[11] B 3,982,232

[45] Sept. 21, 1976

[54] TRAFFIC USAGE DATA GATHERING APPARATUS

[75] Inventor: Richard Henry Etra, Forest Hills, N.Y.

[73] Assignee: Bell Telephone Laboratories, Incorporated, Murray Hill, N.J.

[22] Filed: Jan. 16, 1975

[21] Appl. No.: 541,496

[44] Published under the second Trial Voluntary Protest Program on January 27, 1976 as document No. B 541,496.

[52] U.S. Cl. ........................................ 340/172.5
[51] Int. Cl.² ........................................ G06F 1/00
[58] Field of Search ............... 340/172.5; 179/8 A

[56] References Cited
UNITED STATES PATENTS

| | | | |
|---|---|---|---|
| 3,099,819 | 7/1963 | Barnes | 340/172.5 |
| 3,115,549 | 12/1963 | Lamneck et al. | 179/8 A |
| 3,196,401 | 7/1965 | Lamneck | 340/172.5 |
| 3,231,866 | 1/1966 | Goetz et al. | 340/172.5 |
| 3,546,678 | 12/1970 | Callaway et al. | 340/172.5 |
| 3,588,837 | 6/1971 | Rash et al. | 340/172.5 |
| 3,732,547 | 5/1973 | Etra | 340/172.5 |
| 3,866,185 | 2/1975 | Etra et al. | 340/172.5 |

FOREIGN PATENTS OR APPLICATIONS

| | | | |
|---|---|---|---|
| 1,089,499 | 11/1967 | United Kingdom | 179/8 A |

*Primary Examiner*—Raulfe B. Zache
*Attorney, Agent, or Firm*—Donnie E. Snedeker

[57] ABSTRACT

A traffic data gathering apparatus with a local memory having a control word per data gathering input provides highly flexible, remotely modifiable determination of various data gathering features associated with each individual input. Thus, the effective data gathering rate for each input is determinable on a per input basis to accommodate data from different types of equipment; and the data from selected pluralities of the inputs can be grouped, and grouping changes made, with considerable ease and flexibility. The data gathering rates are determined by scaling the scanning rate or, for greater resolution, by scaling data obtained at the scanning rate.

16 Claims, 3 Drawing Figures

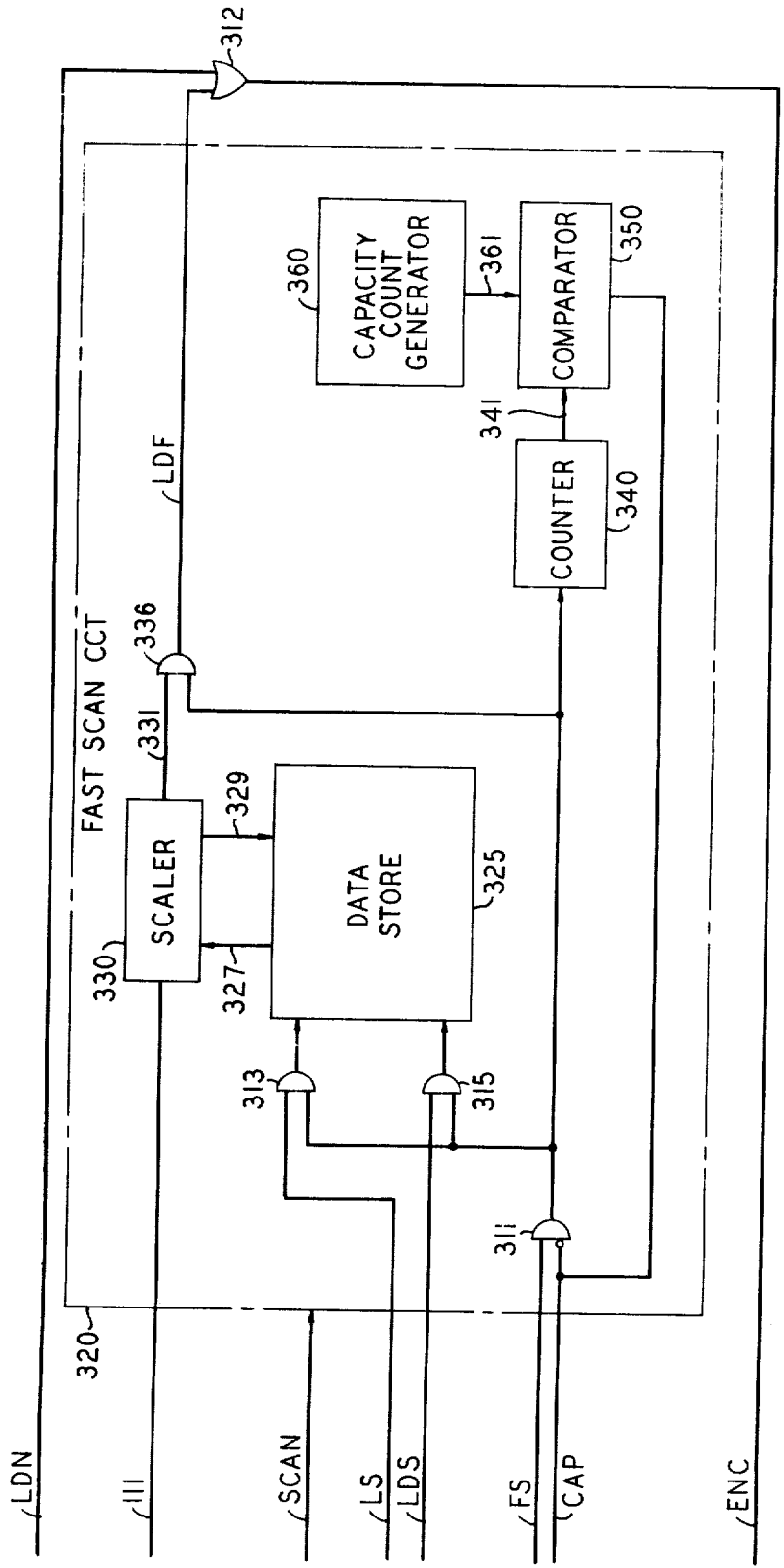

TRAFFIC USAGE DATA GATHERING APPARATUS

BACKGROUND OF THE INVENTION

This invention relates to monitoring and data gathering apparatus, and more particularly in one specific embodiment to traffic usage data gathering apparatus.

The gathering of data pertaining to the usage or traffic density of certain services and equipment is of considerable interest in a number of fields. In the telephone industry, for example, studies are conducted regularly to accumulate such data with regard to telephone equipment utilization. Interpretation of the accumulated data facilitates the proper assignment and disposition of the various telephone lines and equipment, determines the quantities of equipment necessary to handle given volumes of telephone traffic, and provides for further planning with regard to telephone equipment requirements. Thus, sufficiency of present units of equipment may be determined, units may be reallocated to areas of greater need, additional units may be allotted and the number of circuits between central offices may be altered, or other appropriate action taken, to provide optimal service consistent with overall economy of operation.

Usage data may be obtained, for example, by repeatedly scanning the various units of equipment at regular intervals and registering indications of whether the individual units of equipment are seized or are in use at the time of the scan. By assuming that a seizure or busy condition which is present at the time of the scan exists for the interval between successive scans, each indication registered is indicative of a precise period of usage of the individual unit being observed. Proper selection of the scanning interval provides the usage data in desired units of traffic measurement. For example, an effective scanning or data gathering rate of 36 scans per hour produces usage data in terms of hundred call seconds (CCS).

For the usage data to be of greatest practical use, it is desirable to gather the data in a form suitable for processing automatically by centralized data processing equipment. Typical arrangements widely used for gathering usage data in the telephone industry employ rotary or crossbar electromechanical apparatus, such as disclosed in Lamneck-Wichmann, U.S. Pat. No. 3,115,549, issued Dec. 24, 1963. Although generally satisfactory for usage data collection limited to periods of several hours daily, disadvantages have arisen related to wear and maintenance of such arrangements when used for greatly extended or nearly continuous data gathering, such as for real time or near-real time equipment monitoring. On the other hand, when such electromechanical arrangements are used for brief intervals (e.g., 5–10 minutes) for gathering data from equipment having short holding times, significant data errors may be introduced.

Another disadvantage of existing data gathering arrangements is that they typically permit grouping of the data gathering inputs only in fixed group sizes or in multiples of a certain group size. Moreover, such input grouping has been effected heretofore via wired crossconnection schemes, making grouping and subsequent regrouping of the data gathering points costly, time-consuming and error-prone tasks. In addition, such wired cross-connection schemes do not practically permit the occasional collection of ungrouped data from the individual gathering inputs, as may be desirable for maintenance and other purposes.

Further limitations encountered with existing arrangements relate to the number of data inputs that can be handled economically and to the ease and flexibility with which new data gathering features can be provided.

Accordingly, a need exists for improved data gathering apparatus which will economically and accurately gather data at variable scanning rates from large numbers of data gathering inputs and which will provide for flexible grouping and regrouping of the data gathering inputs with greater ease than known arrangements.

SUMMARY OF THE INVENTION

In a specific illustrative embodiment of a traffic usage data gathering apparatus according to my invention, a local memory is provided for storing control information defining various data gathering features or characteristics associated with each data gathering input, such as the data gathering rate and data grouping for the associated input. Thus, the rate at which data is gathered for each input is determinable on a per input basis to accommodate data from different types of equipment. During the same data gathering interval, for example, usage data may be obtained from a first plurality of inputs in the usual 100 seconds CCS units and from a second plurality of inputs in 10 second units. The rate at which usage data is gathered from a particular input may be changed readily for different data gathering intervals by simply modifying the control information associated with the particular input in memory.

The usage data is gathered at the different rates by scanning the data inputs at a rate exceeding the fastest data gathering rate contemplated, and by then scaling down the scanning rate or the scanning rate data to obtain the desired data gathering rate. For example, assuming that usage data is desired in CCS units, the scanning rate clock may be scaled down accordingly to correspond to approximately 36 scans per hour during which the data inputs are sampled. If greater resolution of the usage data is needed, such as from equipment having very short holding times, data inputs are sampled at the scanning rate and the data thus obtained is scaled down to correspond to the desired data gathering rate.

According to one aspect of the illustrative embodiment, substantially unlimited input grouping flexibility is provided by the control information per input in the local memory. Input grouping is variable from one data gathering input up to a group size equal to the total input scanning capacity by assigning a group identity to each input. The group identity assigned to a particular input may be changed readily for different data gathering intervals by modifying the associated control information. Further, the group identity can be ignored during a particular data gathering interval for gathering data on an individual input basis without modifying the control information in the local memory.

A further aspect of the illustrative embodiment is directed to locally accumulating usage data from input groups or selected combinations of input groups. A word in memory on a per data register basis defines the group or combination of groups from which data is to be accumulated in the particular register. Matching the memory words with the group address control information for each input scanned during a data gathering interval steers the gathered data to the appropriate registers for accumulation.

BRIEF DESCRIPTION OF THE DRAWING

The above and other objects and features of the invention may be fully apprehended from the following detailed description and the accompanying drawing, in which FIGS. 1, 2 and 3, when arranged according to FIG. 4, comprise a block diagram of an illustrative embodiment of traffic data gathering apparatus in accordance with the principles of my invention.

DETAILED DESCRIPTION

Figure 1:
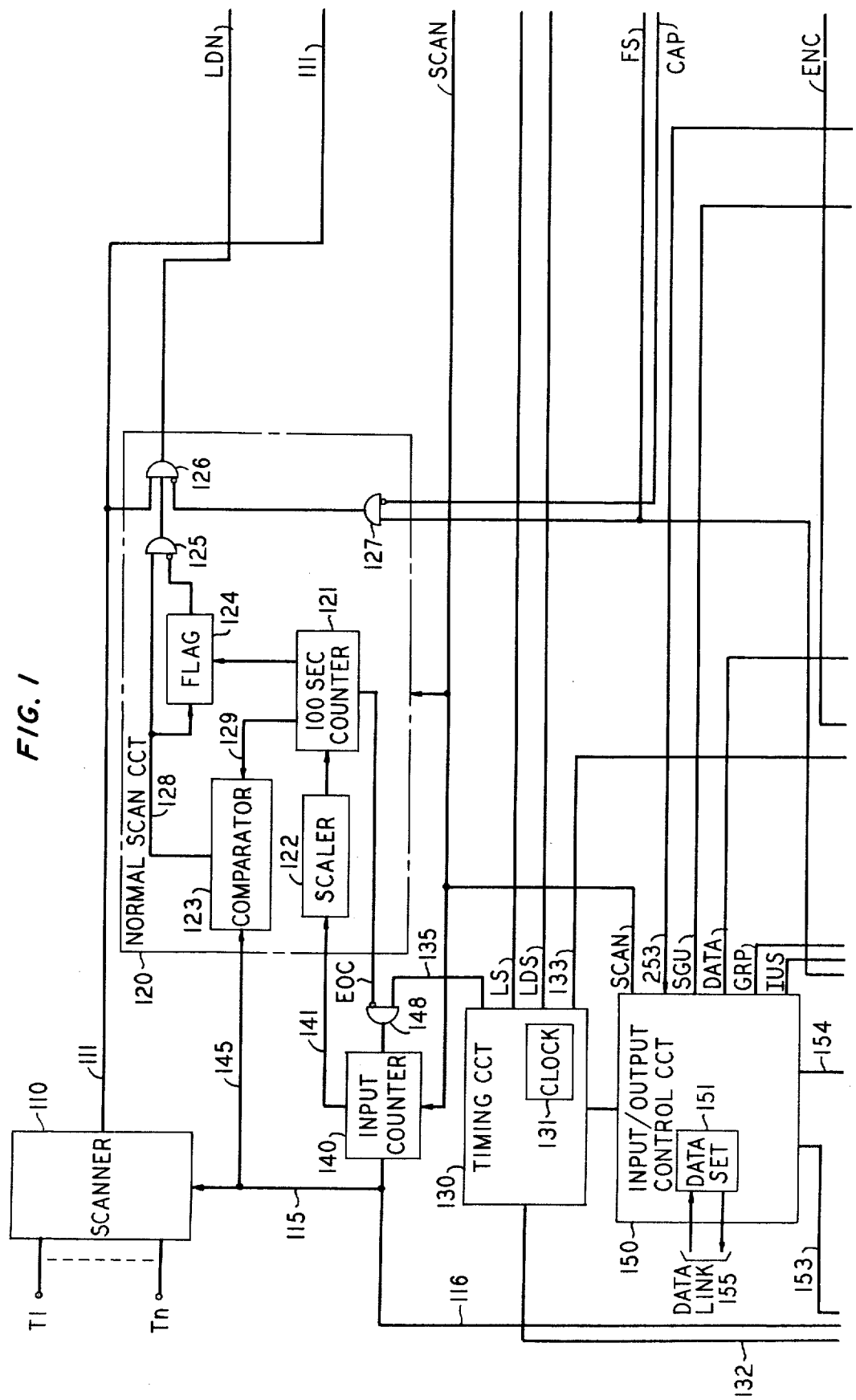
Figure 2:
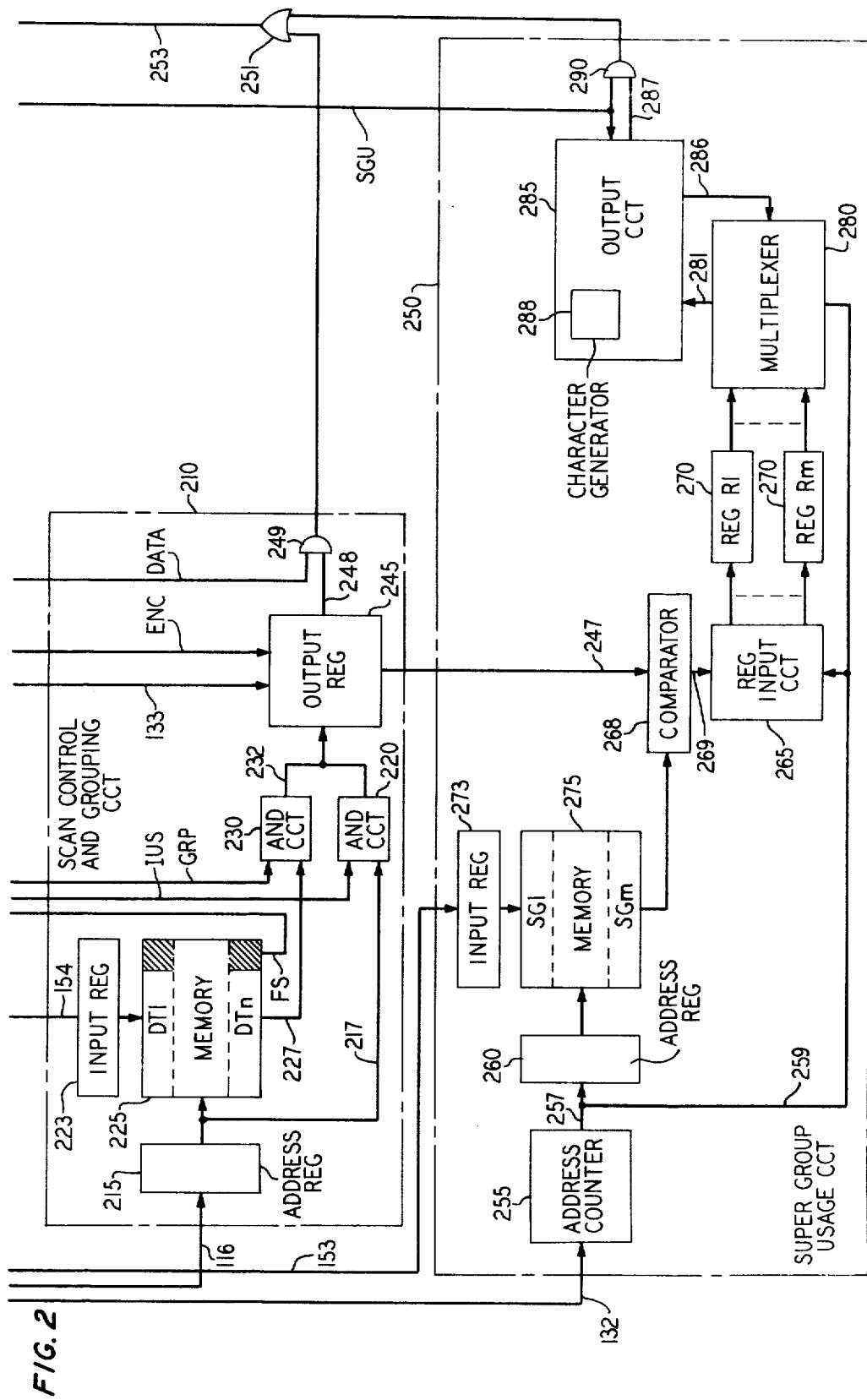

The illustrative embodiment depicted in FIGS. 1–3 is an arrangement for monitoring and gathering traffic data from a plurality of circuit or equipment units (not shown) connected to individual ones of data gathering inputs T*l* – T*n*. For example, each of the units connected to inputs T*l* – T*n* may comprise individual telephone trunk circuits, or groups of trunk circuits, and the condition to be monitored may be one of seizure for use. The seizure of an equipment unit, it will be assumed, provides a distinctive indication at the data gathering input T*l* – T*n* connected thereto, such as a particular potential level. In the case of telephone equipment units, the seizure for use indication is typically ground potential extended by a relay contact closure. The embodiment in FIGS. 1 – 3 functions to detect the presence of usage indications at the data gathering inputs and to provide manifestations thereof in a form suitable for local recording or for transmission to a central facility for subsequent processing by automatic data processing equipment.

The illustrative traffic usage data gathering arrangement comprises scanner 110, timing circuitry including timing circuit 130 and input counter 140, normal scan circuit 120 and fast scan circuit 320 for providing several different effective scanning rates at which the data may be gathered, scan control and grouping circuit 210 for selectively controlling various aspects such as grouping and scanning rate of the data gathered with respect to the individual inputs, super group usage circuit 250 for providing additional input grouping flexibility, and input/output control circuit 150. Data set 151 may be included in input/output control circuit 150 for communicating via data link 155 with a central data collection facility (not shown). Thus, usage data gathered by the arrangement in FIGS. 1 – 3 may be transmitted to the central facility over link 155, and commands may be received thereover from the central facility to initiate scan cycles, to assign input groups and scanning rates, to determine the gathering of data on an individual input or grouped input basis, etc.

The usage data may be transmitted over link 155 in real-time or, as is well known in the art, input/output control circuit 150 may include suitable buffering or data storage to facilitate transmitting the usage data to the central facility on a buffered or periodic basis. Similarly, control circuit 150 may include a conventional timer for determining the periods during which data is to be gathered and for initiating successive scan cycles. However, herein it will be assumed that each scan cycle is initiated by a scan command received on data link 155 from the central facility. Responsive thereto, control circuit 150 extends a scan signal over lead SCAN to input counter 140 and to scan circuits 120 and 320, clearing data store 325 and resetting counters 140, 121 and 340. This initializes the system to begin a scan cycle. Timing during the scan cycle is via clock signals generated by clock 131, illustratively at a frequency on the order of 350 kHz, and extended by timing circuit 130 over path 135 through gate 148 to increment input counter 140.

In operation, data gathering inputs T*l* – T*n* are periodically scanned, one at a time, by scanner 110 under control of a sequence of corresponding address outputs *l* – *n* of input counter 140 over path 115. Individual usage indications appearing at inputs T*l* – T*n* are detected by scanner 110 and are extended serially over path 111 to normal scan circuit 120 and fast scan circuit 320. As will be described in detail below, usage data may be gathered from each of data gathering inputs T*l* – T*n* via scan circuit 120 at a first (normal)) rate, e.g., 36 scans per hour to provide usage data in terms of standard hundred call seconds, or via scan circuit 320 at a second (fast) rate, e.g., 360 scans per hour to provide high resolution data in terms of 10 call seconds. It will be noted, however, that all of data gathering inputs T*l* – T*n* are scanned at the same actual scanning rate, as determined by timing circuit 130 through input counter 140, and the individual usage indications appearing on path 111 are converted selectively in scan circuits 120 and 320 to provide the usage data in the desired scan units. In the illustrative embodiment, for example, assuming 7000 data gathering inputs T*l* – T*n* and a clock signal frequency of approximately 350 kHz, the scanning rate may be on the order of 20 milliseconds. This corresponds to a scan rate on the order of 5000 times the standard 100 second rate for CCS usage units, or 500 times the 10 second rate.

The rate at which usage data is to be gathered from a particular one of inputs T*l* – T*n* is controlled selectively by scan control and grouping circuit 210. Memory 225 in circuit 210 contains a respective control word DT*l* – DT*n* associated with each of data gathering inputs T*l* – T*n*, each such control word including scan control information for the associated data gathering input. Control words DT*l* – DT*n* also contain group identity information for gathering such usage data with respect to selected groups of inputs T*l* – T*n*, as will be described in detail below. During scanning of inputs T*l* – T*n*, control words DT*l* – DT*n* in memory 225 are read out in sequence, via address register 215, under control of the successive outputs of input counter 140 extended over path 116. The group identity portion of each control word is read out on path 227, and the scan control information is read out over path FS to scan circuits 120 and 320.

Normal scan circuit 120 for converting scanning rate data on path 111 to 100 second rate CCS data includes counter 121 which recycles every 100 seconds. Counter 121 is incremented by input counter 140, the scanning rate pulses therefrom over path 141 being scaled down by an appropriate factor (illustratively 5,000) via scaler 122. The address outputs of input counter 140 on path 145 and the output of counter 121 on path 129 are compared, via comparator 123, to generate a signal on lead 128 when a match occurs. Since counter 140 recycles at the much faster scanning rate, each state of 100 second counter 121 will match the corresponding state of counter 140 many times during each cycle of counter 121. Accordingly, flag circuit 124 is provided to ignore all but the first such match occurring for each state of counter 121. Thus, the first match for a particular state of counter 121 is extended over lead 128 through gate 125 as a data strobe signal to data gate 126. At the same time, the match signal on lead 128 sets flag circuit 124 to prevent matches of that particular state during subsequent cycles of input counter 140 from being extended through gate 125. Flag circuit 124 is reset each time counter 121 changes state.

The strobe signal from gate 125 enables data gate 126 coincident with the appearance on path 111 of any usage indication for the particular input corresponding to the matched states of counters 121 and 140. The usage indication, if present, is thus extended through gate 126, over path LDN, through OR gate 312, to path ENC as a unit of 100 second usage data for the particular input.

When a full 100 second scan cycle has been completed, counter 121 provides an end-of-cycle signal on lead EOC to inhibit further cycling of input counter 140 until another scan cycle is initiated by a subsequent scan signal on lead SCAN.

Usage data may be gathered in terms of other than 100 call seconds in a similar manner by appropriate scaling down of the scanning rate pulses on lead 141. Thus, 10 second usage data can be gathered by scaling down the scanning rate pulses to a 10 second clock rate. However, the resolution of the data is improved by scaling down the usage indications on path 111 rather than scaling down the scanning pulses on lead 141. This can be particularly important when relatively short periods of usage measurements are gathered from equipment having very short holding times. In the illustrative embodiment, fast scan circuit 320 converts the scanning rate data to 10 call second data by scaling down the usage indications on path 111.

For this purpose, fast scan circuit 320 includes temporary data store 325 and scaler 330. Data store 325 may comprise, for example, a recirculating shift register having a total data word capacity equal to the maximum number of inputs T$l$ - T$n$ from which it is desired to gather high resolution fast scan data. One data word location is required for each fast scan input. The data words stored in data store 325 are assumed, for the purposes of illustration, to be ordered in the scanning sequence of the corresponding inputs T$l$ - T$n$. As mentioned above, each of data gathering inputs T$l$ - T$n$ has associated therewith in memory 225 scan control information indicating whether normal scan or fast scan data is to be gathered with respect to the individual input. This can control information, illustratively a single bit of value 0 for normal scan and of value 1 for fast scan, enables the appropriate one of scan circuits 120 and 320 over path FS each time the individual input T$l$ - T$n$ is scanned. When a fast scan input is sampled by scanner 110, normal scan circuit 120 is thus disabled via the fast scan control bit on path FS directed through gate 127 to gate 126. At the same time, fast scan circuit 320 is enabled via gate 311, the fast scan bit on path FS being extended therethrough to enable gates 313, 315 and 336. The data word in store 325 corresponding to the particular fast scan input is unloaded over path 327 to scaler 330, responsive to an unload signal from timing circuit 130 on lead LS. If a usage indication is present on path 111 at this time, scaler 330 increments the data word therein. If the incremented data word in scaler 330 equals the equivalent of 10 seconds of usage (illustratively a count of 500), the data word is reset and an output is provided on path 331 through gate 336, over path LDF, through OR gate 312 to path ENC as a unit of 10 second usage data for the particular input. The reset data word, or the incremented data word in the event a count of 500 has not been reached, is reloaded into data store 325 over path 329, responsive to a load signal from timing circuit 130 on lead LDS.

Typically, fast scan data will be gathered from only a portion $k$ of data gathering inputs T$l$ - T$n$. Thus, data store 325 need contain only $k$ data words. If more than $k$ inputs are assigned to fast scan data gathering. exceeding the capacity of data store 325, the first $k$ such inputs scanned during a cycle will be treated on a fast scan basis and the remaining inputs will be treated on a normal scan basis. Counter 340 is incremented by each fast scan control bit appearing on path FS during a scan cycle, and the count in counter 340 is directed over path 341 to comparator 350. At the same time, a count corresponding to the capacity $k$ of store 325 is provided to comparator 350 over path 361 by capacity count generator 360. Thus, when the number of fast scan control bits during a cycle reaches the capacity of data store 325, comparator 350 provides a capacity full signal on lead CAP. The signal on lead CAP disables fast scan circuit 310 for the remainder of the cycle and enables normal scan circuit 120. Subsequent fast control bits on path FS are blocked at gates 127 and 311 in scan circuits 120 and 320, respectively, and are ignored. In this manner inputs T$l$ - T$n$ are scanned in sequence to gather usage data at the assigned rates therefor until the capacity of data store 325 is exhausted. All inputs T$l$ - T$n$ beyond this point in the scan cycle are handled at the normal 100 second rate regardless of the scan control information therefor in memory 225. The capacity full signal on lead CAP can also be used in conventional manner to provide a suitable error indication if desired.

The 10 second and 100 second units of usage data, provided on path ENC in the manner described above, are encoded in scan control and grouping circuit 210 and are extended to input/output control circuit 150 for transmission over data link 155 to the central facility. Address outputs $l$ - $n$ of input counter 140, directed over path 116 to address register 215 in circuit 210, are used for encoding the usage data gathered from the corresponding ones of inputs T$l$ - T$n$. Each address output $l$ - $n$ registered in turn in address register 215 is directed over path 217 to AND circuit 220. Assuming the gathering of usage data on an individual input basis, rather than a grouped input basis, AND circuit 220 is enabled by control circuit 150 over individual usage lead IUS, During a scan cycle, therefore, AND circuit 220 extends the sequence of input addresses $l$ - $n$ over path 232 to output register 245. If a corresponding unit of usage data appears coincident therewith on path ENC, the address on path 232 is registered in output register 245 as an encoded unit of usage data for the respective input T$l$ - T$n$.

It is often desirable to gather usage data, not only with respect to inputs connected to individual ones of inputs T$l$ - T$n$, but also with respect to groups of units connected to selected pluralities of inputs T$l$ - T$n$. Substantially unlimited input grouping flexibility is provided in accordance with one aspect of the illustrative embodiment herein via scan control and grouping circuit 210. Each input T$l$ - T$n$, as mentioned above, has associated therewith in memory 225 a respective control word DT$l$ - DT$n$ containing any group identity information for the individual input. Thus, if it is desired to group data from a selected plurality of inputs T$l$ − T$n$, the corresponding control words in memory 225 for each input of the selected plurality will contain common group identity information. For example, the group identity may be an unused address assigned to the group, such as address $n + 1$, $n + 2$, etc.

During scanning of each of the selected plurality of inputs T$l$ - T$n$ forming the group, the group identity of each associated control word DT$l$ - DT$n$ is read out of memory 225 over path 227 to AND circuit 230. For gathering grouped input usage data during the current scan cycle, AND circuit 230 is enabled by input/output control circuit 150 over group usage lead GRP, and AND circuit 220 remains disabled. The group identity on path 227 is thus extended through AND circuit 230 over path 232 to output register 245. If a unit of usage data for the particular input appears concurrently on path ENC in the manner described above, the group identity is gated thereby into input register 245 as an encoded unit of usage data for the respective group comprising the selected plurality of inputs T$l$ - T$n$.

During a scan cycle for gathering grouped input usage data, data can be gathered from individual ones of inputs T$l$ - T$n$ which are not part of a group by simply storing the address of the individual input as the group identity information in the respective control word DT$l$ - DT$n$ therefor. In effect, the individual input then comprises a group of one.

The encoded usage data in output register 245 is extended to control circuit 150 for transmission by enabling gate 249 over data lead DATA. With gate 249 enabled, the encoded usage data is shifted serially out of register 245, via clock pulses on lead 133 from timing circuit 130, and is extended over path 248 through gate 249, through OR gate 251, over path 253 to control circuit 150.

In accordance with another aspect of the illustrative embodiment in FIGS. 1 – 3, usage data can be gathered via circuit 250 in group combinations, or sets of groups, referred to herein as "super groups." Super group usage data may be employed during subsequent processing, for example, as a useful data validation check of other data summations. Furthermore, it is often desirable to group data pertaining to all equipment of the same type, such as line link frames or trunk link frames, and to have the group data summations available on a short-term, real-time basis without waiting for subsequent processing of individual or group usage data. The usage data for each super group is collected in a corresponding one of registers 270, and at the end of each data gathering interval the data totals are extended via multiplexer 280 to output circuit 285.

Each super group has associated therewith in memory 275 a unique super group word SG$l$ - SG$M$ defining the boundaries of the super group, i.e., defining the particular groups which comprise the super group. For example, this can be effected quite simply by requiring that all inputs assigned to a super group have contiguous group addresses. Thus, each super group word SG$l$ - SG$M$ in memory 275 need only contain the addresses of the boundary groups, each such word being stored in memroy 275 in order of address boundary magnitudes. During scanning operation for gathering regular group usage data in the manner described above, each group address registered in output register 245 is compared, via comparator 268, with the super group boundaries in memory 275, starting with the first group address boundaries in word SG$l$ and proceeding in order of magnitude through word SG$M$ until the appropriate super group is determined. The corresponding one of registers 270 is then incremented. It will be appreciated that data can be gathered from an individual group in this manner by simply storing the address of the individual group in memory 275 as the boundaries for the super group.

More particularly, responsive to timing signals on lead 132 from timing circuit 130, address counter 255 generates a sequence of $l - m$ addresses on path 257. Each such address, corresponding to a particular super group, is registered in turn in address register 260 and effects readout to comparator 268 of a respective one of words SG$l$ - SG$M$. Concurrently, the group address registered in output register 245 is extended to comparator 268 over path 247 and is thus compared in turn with successive ones of words SG$l$ - SG$M$. When the particular super group word SG$L$ - SG$M$ is found which defines the address boundaries within which the group address on path 247 lies, comparator 268 indicates a match over path 269 to register input circuit 265. At the same time, the corresponding super group address on path 257 is extended over path 259 to register input circuit 265, causing the super group usage total in the corresponding one of registers 270 to be incremented.

The super group usage data totals in registers 270 are read out at the end of each data gathering interval during the period when no other data are being transmitted. During this period control circuit 150 enables gate 290 via lead SGU and initiates operation of output circuit 285, the latter extending strobe signals over lead 286 to multiplexer 280. The super group totals are thus read out of registers 270 in turn via multiplexer 280, responsive to the successive super group addresses $l - m$ appearing on path 259 and the strobe signals on lead 286. The totals are extended by multiplexer 280 over path 281 to output circuit 285. output circuit 285 directs the super group usage totals serially over lead 287, through enabled gate 290 and OR gate 251, over lead 253 to control circuit 150 for transmission to the central facility. Output circuit 285 may also include a character generator 286 for providing suitable header and trailer characters to delineate the super group usage data.

Super group words SG$l$ - SG$M$ in memory 275 can be modified readily by control circuit 150 over path 153 through input register 273. Similarly, the group identity information and the scan control information in control words DT$l$ - DT$n$ in memory 225 can be modified readily over path 154 through input register 223. Thus grouping changes made necessary by equipment additions or reassignments, for example, can be handled simply and quickly by transmission of new grouping information to control circuit 150 over data link 155. The ease with which grouping changes can be made also permits registers 270 to be shared by several groups, collecting data with respect to a first set of groups during one data gathering interval and with respect to a second set of groups during another data gathering interval, modifying the grouping information for each interval.

It is to be understood that the above-described arrangements are merely illustrative of the principles of the invention. My invention may be employed to advantage in a wide variety of data gathering applications, particularly those requiring the funneling of data from a plurality of sources to a single registering or recording apparatus. For example, my invention may be utilized to monitor telephone message unit indications for billing purposes, or to monitor indications in various telemetering applications for billing or statistical purposes, such as in time-shared computer facilities. Numerous and varied other arrangements in accordance with the principles of the invention may be devised readily by those skilled in the art without departing from the spirit and scope of the invention.

What is claimed is:

1. Apparatus for gathering data pertaining to the status of each of a plurality of inputs comprising, means for scanning said plurality of inputs in succession, individual means associated with each of said inputs for storing control information associated with each said input, and control means operable with said scanning means for gathering said data from each of said inputs in accordance with said control information associated with each said input.

2. Apparatus according to claim 1 wherein said control means includes means responsive to said control information for selectively determining the rate at which said data is gathered from individual ones of said plurality of inputs.

3. Apparatus according to claim 2 wherein said control means includes first means operable for gathering said data at a first data gathering rate, second means operable for gathering said data at a second data gathering rate, and means responsive to said control information associated with one of said inputs for selectively operating one of said first and second means when said one input is scanned.

4. Apparatus according to claim 3 wherein said scanning means scans said inputs at a fixed rate and wherein said first means includes means for scaling said fixed rate down to said first data gathering rate.

5. Apparatus according to claim 3 wherein said scanning means scans said inputs to obtain data at a fixed rate and wherein said second means includes means for scaling data gathered at said fixed rate down to said second data gathering rate.

6. Apparatus according to claim 5 wherein said second means includes a pluraliity of data storage registers individually associated during scanning with respective ones of said inputs from which data is to be gathered at said second data gathering rate.

7. Apparatus according to claim 6 further comprising means for determining the unavailability of one of said data storage registers for gathering data from a particular input at said second rate, and means responsive to said unavailability determination for inhibiting the operation of said second means and for operating said first means when said particular input is scanned.

8. Apparatus according to claim 1 wherein said control means includes means responsive to said control information for grouping said data gathered from selected ones of said plurality of inputs.

9. Apparatus according to claim 8 wherein said control information includes a group identity associated with each of said selected ones of said inputs, and wherein said apparatus further comprises means for encoding data gathered from each of said selected ones of said inputs in accordance with said group identity associated therewith.

10. Apparatus according to claim 8 further comprising group data means operative with said scanning means for accumulating data pertaining to a plurality of groups of said inputs, each group including different selected ones of said inputs, said group data means including a plurality of storage registers respectively associated with individual ones of said plurality of groups and including means for identifying the inputs included in each of said groups.

11. Apparatus according to claim 10 wherein said identifying means includes a memory for storing a respective group word defining each of said groups, means operable during the scanning of one of said inputs for comparing each group word with a discrete portion of said control information associated with said one input, and means responsive to said comparison for directing data from said one input to an appropriate one of said storage registers for accumulation.

12. Apparatus for gathering usage data pertaining to a plurality of inputs comprising, means for scanning said plurality of inputs, means for storing a control word associated with each of said inputs, said control word including scan control information and group identity information for the associated input, means for accessing said control words individually in substantial synchronism with the scanning of said input associated therewith, means operative during scanning for controlling the rate at which data is gathered from each of said inputs individually in accordance with said scan control information associated with each said input, and means operative during scanning for encoding the data gathered from each of said inputs in accordance with said group identity information associated with each said input.

13. Apparatus according to claim 12 further comprising means for modifying selected ones of said control words.

14. Apparatus according to claim 12 further comprising means operable for inhibiting the operation of said rate controlling means and for enabling the gathering of data from said inputs at a predetermined data gathering rate.

15. Apparatus according to claim 12 further comprising means operative during scanning for ignoring said group identity information and for encoding data gathered from each of said inputs in accordance with the identity of each said input.

16. Apparatus according to claim 12 further comprising means for locally accumulating data from selected combinations of said inputs; said accumulating means including a plurality of data registers, a memory word associated with each register identifying the combination of said inputs from which data is to be accumulated in said associated register, means for comparing said memory words with said group identity information for each said input during scanning, and means responsive to said comparison for directing said data to an appropriate one of said registers for accumulation.

* * * * *